United States Patent
Zhang et al.

(10) Patent No.: US 11,556,581 B2
(45) Date of Patent: Jan. 17, 2023

(54) SKETCH-BASED IMAGE RETRIEVAL TECHNIQUES USING GENERATIVE DOMAIN MIGRATION HASHING

(71) Applicant: Inception Institute of Artificial Intelligence, Ltd., Abu Dhabi (AE)

(72) Inventors: Jingyi Zhang, Chengdu (CN); Fumin Shen, Chengdu (CN); Li Liu, Abu Dhabi (AE); Fan Zhu, Abu Dhabi (AE); Mengyang Yu, Abu Dhabi (AE); Ling Shao, Abu Dhabi (AE); Heng Tao Shen, Abu Dhabi (AE)

(73) Assignee: INCEPTION INSTITUTE OF ARTIFICIAL INTELLIGENCE, LTD., Al Maryah Island (AE)

( * ) Notice: Subject to any disclaimer, the term of this patent is extended or adjusted under 35 U.S.C. 154(b) by 1171 days.

(21) Appl. No.: 16/120,790

(22) Filed: Sep. 4, 2018

(65) Prior Publication Data

US 2020/0073968 A1    Mar. 5, 2020

(51) Int. Cl.
*G06F 16/532*  (2019.01)
*G06K 9/62*  (2022.01)
(Continued)

(52) U.S. Cl.
CPC .......... *G06F 16/532* (2019.01); *G06F 16/137* (2019.01); *G06F 16/152* (2019.01);
(Continued)

(58) Field of Classification Search
CPC ...... G06F 16/51; G06F 16/148; G06F 16/152; G06F 16/583; G06F 16/5854;
(Continued)

(56) References Cited

U.S. PATENT DOCUMENTS

| 8,836,817 B2 * | 9/2014 | Sano ...................... H04N 5/765 |
| | | 713/176 |
| 8,983,941 B1 * | 3/2015 | Murphy-Chutorian ..................... |
| | | G06V 10/40 |
| | | 707/723 |

(Continued)

FOREIGN PATENT DOCUMENTS

| AU | 2013288988 A1 * | 2/2015 | ............. G06F 16/50 |
| CN | 104794223 A * | 7/2015 | ............. G06F 16/50 |
| WO | WO-2012102926 A1 * | 8/2012 | ....... G06F 17/30259 |

OTHER PUBLICATIONS

Lin, Z., Ding, G., Hu, M., Wang, J.: Semantics-preserving hashing for cross-view retrieval. In: IEEE Conference on Computer Vision and Pattern Recognition, CVPR 2015, Boston, MA, USA, Jun. 7-12, 2015. (2015) 3864-3872.

(Continued)

*Primary Examiner* — Andrew M Moyer
*Assistant Examiner* — Stephen M Brinich
(74) *Attorney, Agent, or Firm* — Bryan Cave Leighton Paisner LLP

(57) ABSTRACT

This disclosure relates to improved sketch-based image retrieval (SBIR) techniques. The SBIR techniques utilize a neural network architecture to train a domain migration function and a hashing function. The domain migration function is configured to transform sketches into synthetic images, and the hashing function is configured to generate hash codes from synthetic images and authentic images in a manner that preserves semantic consistency across the sketch and image domains. The hash codes generated from the synthetic images can be used for accurately identifying and retrieving authentic images corresponding to sketch queries, or vice versa.

18 Claims, 4 Drawing Sheets

(51) Int. Cl.
   *G06N 3/08* (2006.01)
   *G06F 16/51* (2019.01)
   *G06F 16/13* (2019.01)
   *G06F 16/14* (2019.01)

(52) U.S. Cl.
   CPC .......... *G06F 16/51* (2019.01); *G06K 9/6215* (2013.01); *G06K 9/6262* (2013.01); *G06N 3/08* (2013.01)

(58) Field of Classification Search
   CPC .. G06K 9/6201; G06K 9/6215; G06K 9/6262; G06N 3/02; G06N 3/0454; G06T 2207/20084; G06T 2210/36; G06V 10/82
   USPC ........ 706/2, 5–6, 15; 382/305–306, 218–219
   See application file for complete search history.

(56) References Cited

U.S. PATENT DOCUMENTS

| | | | | |
|---|---|---|---|---|
| 10,248,664 | B1* | 4/2019 | Shen | G06N 3/0454 |
| 2011/0235908 | A1* | 9/2011 | Ke | G06V 10/751 382/218 |
| 2014/0079325 | A1* | 3/2014 | Takahashi | G06F 16/583 382/224 |
| 2014/0226906 | A1 | 8/2014 | Kang | |
| 2016/0358043 | A1* | 12/2016 | Mu | G06K 9/6217 |

OTHER PUBLICATIONS

Jiang, Q., Li, W.: Deep cross-modal hashing. In: 2017 IEEE Conference on Computer Vision and Pattern Recognition, CVPR 2017, Honolulu, HI, USA, Jul. 21-26, 2017. (2017) 3270-3278.
Via, J., Santamaria, I., Pérez, J.: Canonical correlation analysis (CCA) algorithms for multiple data sets: Application to blind SIMO equalization. In: 13th European Signal Processing Conference, EUSIPCO 2005, Antalya, Turkey, Sep. 4-8, 2005. (2005) 1-4.
Liu, H., Ma, Z., Han, J., Chen, Z., Zheng, Z.: Regularized partial least squares for multi-label learning. Int. J. Machine Learning & Cybernetics 9(2) (2018) 335-346.
Liao, S., Hu, Y., Zhu, X., Li, S.Z.: Person re-identification by local maximal occurrence representation and metric learning. In: IEEE Conference on Computer Vision and Pattern Recognition, CVPR 2015, Boston, MA, USA, Jun. 7-12, 2015. (2015) 2197-2206.
Xie, W., Peng, Y., Xiao, J.: Cross-view feature Seaming for scalable social image analysis. In: Proceedings of the Twenty-Eighth AAAI Conference on Artificial Intelligence, Jul. 27-31, 2014, Quebec City, Quebec, Canada. (2014) 201-207.
Kingma, D.P., Ba, J.: Adam: A method for stochastic optimization. CoRR abs/1412.6980 (2014).
Li, Y., Hospedales, T.M., Song, Y., Gong, S,: Free-hand sketch recognition by multi-kernel feature learning. Computer Vision and Image Understanding 137 (2015) 1-11.
Zhang, H., Cissé, M., Dauphin. Y.N., Lopez-Paz, D.: mixup: Beyond empirical risk minimization. CoRR abs/1710.09412 (2017).
Saavedra, J.M., Bustos, B.: An improved histogram of edge local orientations for sketch-based image retrieval. In: Pattern Recognition—32nd DAGM Symposium, Darmstadt, Germany, Sep. 22-24, 2010, Proceedings, (2010) 432-441.
Yu, Q., Yang, Y., Liu, F., Song, Y., Xiang, T., Hospedaies, T.M.; Sketch-a-net: A deep neural network that beats humans. International Journal of Computer Vision 122(3) 411-425.
Bozas, K., Izquierdo, E.: Large scale sketch based image retrieval using patch hashing. In: Advances in Visual Computing—8th International Symposium, ISVC 2012, Rethymnon, Crete, Greece, Jul. 16-18, 2012, Revised Selected Papers, Part I. (2012) 210-219.
Yu, Q., Liu, F., Song, Y., Xiang, T., Hospedaies, T.M., Loy, C.C.; Sketch me that shoe. In: 2016 IEEE Conference on Computer Vision and Pattern Recognition, CVPR 2016, Las Vegas, NV, USA, Jun. 27-30, 2016. (2016) 799-807.
Sangkloy, P., Burnell, N., Ham, C., Hays, J.: The sketchy database: learning to retrieve badly drawn bunnies. ACM Trans. Graph. 35(4) (2016) 119:1-1 19:12.
Song, J., Yu, Q., Song, Y., Xiang, T., Hospedaies, T.M.: Deep spatial-semantic attention for fine-grained sketch-based image retrieval. In: IEEE International Conference on Computer Vision, ICCV 2017, Venice, Italy, Oct. 22-29, 2017, (2017) 5552-5561.
Eitz, M., Hildebrand, K., Boubekeur, T., Alexa, M.: An evaluation of descriptors for large-scale image retrieval from sketched feature lines. Computers & Graphics 34(5) (2010) 482-498.
Liu, L., Shen, F., Shen, Y., Liu, X., Shao, L.: Deep sketch hashing: Fast free-hand sketch-based image retrieval. In: 2017 IEEE Conference on Computer Vision and Pattern Recognition, CVPR 2017, Honolulu, HI, USA, Jul. 21-26, 2017. (2017) 2298-2307.
Saavedra, J.M., Barrios, J.M.: Sketch based image retrieval using learned keyshapes (LKS). In: Proceedings of the British Machine Vision Conference 2015, BMVC 2015, Swansea, UK, Sep. 7-10, 2015. (2015) 164.1-164.11.
Hu, R., Barnard, M., Collomosse, J.P.: Gradient field descriptor for sketch based retrieval and localization. In: Proceedings of the International Conference on Image Processing, ICIP 2010, Sep. 26-29, Hong Kong, China. (2010)1025-1028.
Parui, S., Mittal, A.; Similarity-invariant sketch-based image retrieval in large databases. In: Computer Vision—ECCV 2014—13th European Conference, Zurich, Switzerland, Sep. 6-12, 2014, Proceedings, Part VI. (2014) 398-414.
Dalal, N., Triggs, B.: Histograms of oriented gradients for human detection. In: 2005 IEEE Computer Society Conference on Computer Vision and Pattern Recognition (CVPR 2005), Jun. 20-26, 2005, San Diego, CA, USA. (2005) 886-893.
Hu, R., Collomosse, J.P.; A performance evaluation of gradient field HOG descriptor for sketch based image retrieval. Computer Vision and Image Understanding 117(7) (2013) 790-806.
Saavedra, J.M.: Sketch based image retrieval using a soft computation of the histogram of edge local orientations (S-HELO). In: 2014 IEEE International Conference on Image Processing, ICIP 2014, Paris, France, Oct. 27-30, 2014. (2014) 2998-3002.
Lowe, D.G.: Object recognition from local scale-invariant features. In: ICCV. (1999) 1150-1157.
Isola, P., Zhu, J., Zhou, T., Efros, A.A.: Image-to-image translation with conditional adversarial networks. In: 2017 IEEE Conference on Computer Vision and Pattern Recognition, CVPR 2017, Honolulu, HI, USA, Jul. 21-26, 2017. (2017) 5967-5976.
Li, Y., Hospedaies, T.M., Song, Y., Gong, S.: Intra-category sketch-based image retrieval by matching deformable part models. In: British Machine Vision Conference, BMVC 2014, Nottingham, UK, Sep. 1-5, 2014. (2014).
Liong, V.E., Lu, J., Wang, G., Moulin, P., Zhou, J.: Deep hashing for compact binary codes Seaming. In: Proc. CVPR. (2015) 2475-2483.
Liu, W., Mu, C., Kumar, S., Chang, S.F.: Discrete graph hashing. In: Proc. NIPS. (2014) 3419-3427.
Liu, W., Wang, J., Ji, R., Jiang, Y.G., Chang, S.F.: Supervised hashing with kernels. In: Proc. CVPR. (2012) 2074-2081.
Shen, F., Shen, C., Liu, W., Shen, H.T.: Supervised discrete hashing. In: Proc. CVPR. (2015) 37-45.
Weiss, Y., Torralba, A., Fergus, R.: Spectral hashing. In: Proc. NIPS. (2008) 1753-1760.
Zhang, Z., Chen, Y., Saligrama, V.: Efficient training of very deep neural networks for supervised hashing. In: Proc. CVPR. (2016) 1487-1495.
Shen, F., Yang, Y., Liu, L., Liu, W., Dacheng Tao, H.T.S.: Asymmetric binary coding for image search. IEEE TMM 19 (9) (2017) 2022-2032.
Qin, J., Liu, L., Shao, L., Ni, B., Chen, C., Shen, F., Wang, Y.: Binary coding for partial action analysis with limited observation ratios. In: Proc. CVPR. (2017) 146-155.
Liu, L., Shao, L., Shen, F., Yu, M.: Discretely coding semantic rank orders for image hashing. In: Proc. CVPR. (2017) 1425-1434.
Goodfellow, I., Pouget-Abadie, J., Mirza, M., Xu, B., Warde-Farley, D., Ozair, S., Courville, A., Bengio, Y.; Generative adversarial nets. In: Advances in neural information processing systems. (2014) 2672-2680.

(56) References Cited

OTHER PUBLICATIONS

Denton, E.L., Chintaia, S., Fergus, R., et al.: Deep generative image models using a laplacian pyramid of adversarial networks. In: Advances in neural information processing systems. (2015) 1486-1494.
Mathieu, M.F., Zhao, J.J., Zhao, J., Ramesh, A., Sprechmann, P., LeCun, Y.: Disentangling factors of variation in deep representation using adversarial training. In: Advances in Neural Information Precessing Systems. (2016) 5040-5048.
Sangkloy, P., Lu, J., Fang, C., Yu, F., Hays, J.: Scribbler: Controlling deep image synthesis with sketch and color. In: IEEE Conference on Computer Vision and Pattern Recognition (CVPR). vol. 2. (2017).
Isola, P., Zhu, J.Y., Zhou, T., Efros, A.A.: Image-to-image translation with con-ditional adversarial networks. (2017).
Zhu, J., Park, T., Isola, P., Efros, A.A.: Unpaired image-to-image translation using cycle-consistent adversarial networks. In: IEEE International Conference on Computer Vision, ICCV 2017, Venice, Italy, Oct. 22-29, 2017. (2017) 2242-2251.
Bui, T., Ribeiro, L., Ponti, M., Collomosse, J.P.: Generalisation and sharing in triplet convnets for sketch based visual search. CoRR abs/1611.05301 (2016).
Xu, P., Yin, Q., Huang, Y., Song, Y., Ma, Z., Wang, L., Xiang, T., Kleijn, W.B., Guo, J.: Cross-modal subspace learning for fine-grained sketch-based image retrieval. Neurocomputing 278 (2018) 75-86.
Li, K., Pang, K., Song, Y., Hospedaies, T.M., Zhang, H., Hu, Y.: Fine-grained sketch-based image retrieval: The role of part-aware attributes. In: 2016 IEEE Winter Conference on Applications of Computer Vision, WACV 2016, Lake Piacid, NY, USA, Mar. 7-10, 2016. (2016) 1-9.
Qi, Y., Song, Y., Zhang, H., Liu, J.: Sketch-based image retrieval via Siamese convolutional neural network. In: 2016 IEEE International Conference on Image Processing, ICIP 2016, Phoenix, AZ, USA, Sep. 25-28, 2016. (2016) 2460-2464.
Xu, P., Yin, Q., Qi, Y., Song, Y., Ma, Z., Wang, L., Guo, J.: Instance-level coupled subspace learning for fine-grained sketch-based image retrieval. In: Computer Vision—ECCV 2016 Workshops—Amsterdam, The Netherlands, Oct. 8-10 and 15-16, 2016, Proceedings, Part 1. (2016) 19-34.
Li, K., Pang, K., Song, Y., Hospedales, T.M., Xiang, T., Zhang, H.: Synergistic instance-level subspace alignment for fine-grained sketch-based image retrieval. IEEE Trans. Image Processing 26(12) (2017) 5908-5921.
Song, J., Qian, Y., Song, Y.Z., Xiang, T., Hospedales, T.: Deep spatial-semantic attention for fine-grained sketch-based image retrieval. In: ICCV. (2017).
Zhang, X., Zhou, S., Feng, J., Lai, H., Li, B., Pan, Y., Yin, J., Yan, S.: Hashgan: Attention-aware deep adversarial hashing for cross modal retrieval. CoRR abs/1711.09347 (2017).
He, K., Zhang, X., Ren, S., Sun, J.: Deep residual learning for image recognition. In: 2016 IEEE Conference on Computer Vision and Pattern Recognition, CVPR 2016, Las Vegas, NV, USA, Jun. 27-30, 2016. (2016) 770-778.
Gui, J., Liu, T., Sun, Z., Tao, D., Tan, T.: Fast supervised discrete hashing. IEEE Trans. Pattern Anal. Mach. Intell. 40 (2) (2018) 490-496.
Eitz, M., Hays, J., Alexa, M.: How do humans sketch objects? ACM Trans. Graph. 31(4) (2012)44:1-44:10.
Deng, J., Dong, W., Socher, R., Li, L.J., Li, K., Fei-Fei, L.; Imagenet: A large-scale hierarchical image database. In: Proc. CVPR. (2009) 248-255.

Pang, K. et al. "Cross-domain Generative Learning for Fine-Grained Sketch-Based Image Retrieval", BMVC, 2017, [online], [retrieved from the Internet on Nov. 6, 2019], <URL: https://pdfs.semanticscholar.org/1ec8/3b3679a9e8d3ce673cfaea91b02b368c2f5c.pdf>.
Chen, W. et al., "SketchyGAN: Towards Diverse and Realistic Sketch to Image Synthesis", arXiv preprint arXiv:1801.02753v2, published on Apr. 12, 2018, [online], [retrieved from the Internet on Nov. 6, 2019], <URL: https://arxiv.org/pdf/1801.02753.pdf>.
Qiu, Z. et al., "Deep Semantic Hashing with Generative Adversarial Networks", arXiv preprint arXiv: 1804.08275v1, published on Apr. 23, 2018, [online], [retrieved from the Internet on Nov. 6, 2019], <URL: https://arxiv.org/pdf/1804.08275.pdf>.
Zhang, H. et al., "StackGAN++: Realistic Image Synthesis with Stacked Generative Adversarial Networks", arXiv preprint arXiv: 1710.10916v3, published on Jun. 28, 2018, [online], [retrieved from the Internet on Nov. 6, 2019], <URL: https://arxiv.org/pdf/1710.10916.pdf>.
Liu, L. et al., "Deep Sketch Hashing: Fast Free-hand Sketch-Based Image Retrieval", arXiv preprint arXiv: 1703.05605v1, published on Mar. 16, 2017, [online], [retrieved from the Internet on Nov. 6, 2019], <URL: https://arxiv.org/pdf/1703.05605.pdf >.
Creswell, A. et al., "Adversarial Training For Sketch Retrieval", arXiv preprint arXiv: 1607.02748v2, published on Aug. 23, 2016, [online], [retrieved from the Internet on Nov. 6, 2019], <URL: https://arxiv.org/pdf/1607.02748>.
Zhang, J. et al., "Generative domain-migration hashing for sketch-to-image retrieval", Proceedings of the European Conference on Computer Vision, pp. 304-321, published Oct. 9, 2018, [online], [retrieved from the Internet on Nov. 6, 2019], <URL: https://eccv2018.org/openaccess/content_ECCV_2018/papers/Jingyi_Zhang_Generative_Domain-Migration_Hashing_ECCV_2018_paper.pdf>.
Shen, et al. "Zero-Shot Sketch-Imaging Hashing," IEEE/CVF Conference on Computer Vision and Pattern Recognition, IEEE, Jun. 18, 2018.
Zhang, H., Liu, S., Zhang, C., Ren, W., Wang, R., Cao. X.: Sketchnet: Sketch classification with web images. In: 2016 IEEE Conference on Computer Vision and Pattern Recognition, CVPR 2016, Las Vegas, NV, USA, Jun. 27-30, 2016. (2016) 1105-1113.
Wang, F., Kang, L., Li, Y.: Sketch-based 3d shape retrieval using convolutional neural networks. In: IEEE Conference on Computer Vision and Pattern Recogni-tion, CVPR 2015, Boston, MA, USA, Jun. 7-12, 2015. (2015) 1875-1883.
Ding, G., Guo, Y., Zhou, J.: Collective matrix factorization hashing for multimodal data. In: 2014 IEEE Conference on Computer Vision and Pattern Recognition, CVPR 2014, Columbus, OH, USA, Jun. 23-28, 2014. (2014) 2083-2090.
Bronstein, M.M., Bronstein, A.M., Michel, F., Paragios, N.; Data fusion through cross-modality metric learning using similarity-sensitive hashing. In: The Twenty-Third IEEE Conference on Computer Vision and Pattern Recognition, CVPR 2010, San Francisco, CA, USA, Jun. 13-18, 2010. (2010) 3594-3601.
Kumar, S., Udupa, R.: Learning hash functions for cross-view similarity search. In: IJCAI 2011, Proceedings of the 22nd International Joint Conference on Artificial Intelligence, Barcelona, Catalonia, Spain, Jul. 16-22, 2011. (2011) 1360-1365.
Zhang, D., Li, W.: Large-scale supervised multimodal hashing with semantic correlation maximization. In: Proceedings of the Twenty-Eighth AAAI Conference on Artificial Intelligence, Jul. 27-31, 2014, Quebec City, Qubec, Canada. (2014) 2177-2183.

* cited by examiner

SKETCH-BASED IMAGE RETRIEVAL TECHNIQUES USING GENERATIVE DOMAIN MIGRATION HASHING

TECHNICAL FIELD

This disclosure is related to sketch-based image retrieval (SBIR) techniques and, more particularly, to SBIR techniques that utilize neural networks and artificial intelligence (AI) algorithms to migrate sketches into an image domain and to retrieve images corresponding to the sketches.

BACKGROUND

Generally speaking, sketch-based image retrieval (SBIR) is a technology that aims to match sketches (e.g., free-hand or hand-drawn sketches) with corresponding real-world images (e.g., photographs or other media captured with an imaging sensor). A major challenge with effectively implementing SBIR is that free-hand sketches are inherently abstract, which magnifies cross-domain discrepancies between sketches and real-world images. The current solutions for performing SBIR do not adequately address this issue.

One of the technical difficulties that must be addressed with regard to providing an SBIR solution relates to implementing a retrieval technique that allows the data from the sketch and image domains to be sufficiently generalized in a manner that permits accurate retrieval of relevant search results. This problem is especially difficult for categories having large variances. Another challenge with SBIR techniques relates to minimizing the time required to execute an SBIR query. Similar to other image-based retrieval scenarios, the query time of an SBIR query grows increasingly with the size of the database (e.g., the database that includes the images being searched), and exponentially as the dimensions of sketch/image representations increase. Consequently, many of the current SBIR techniques are unable to execute queries on large datasets within a reasonable amount of time.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

Figure 1:
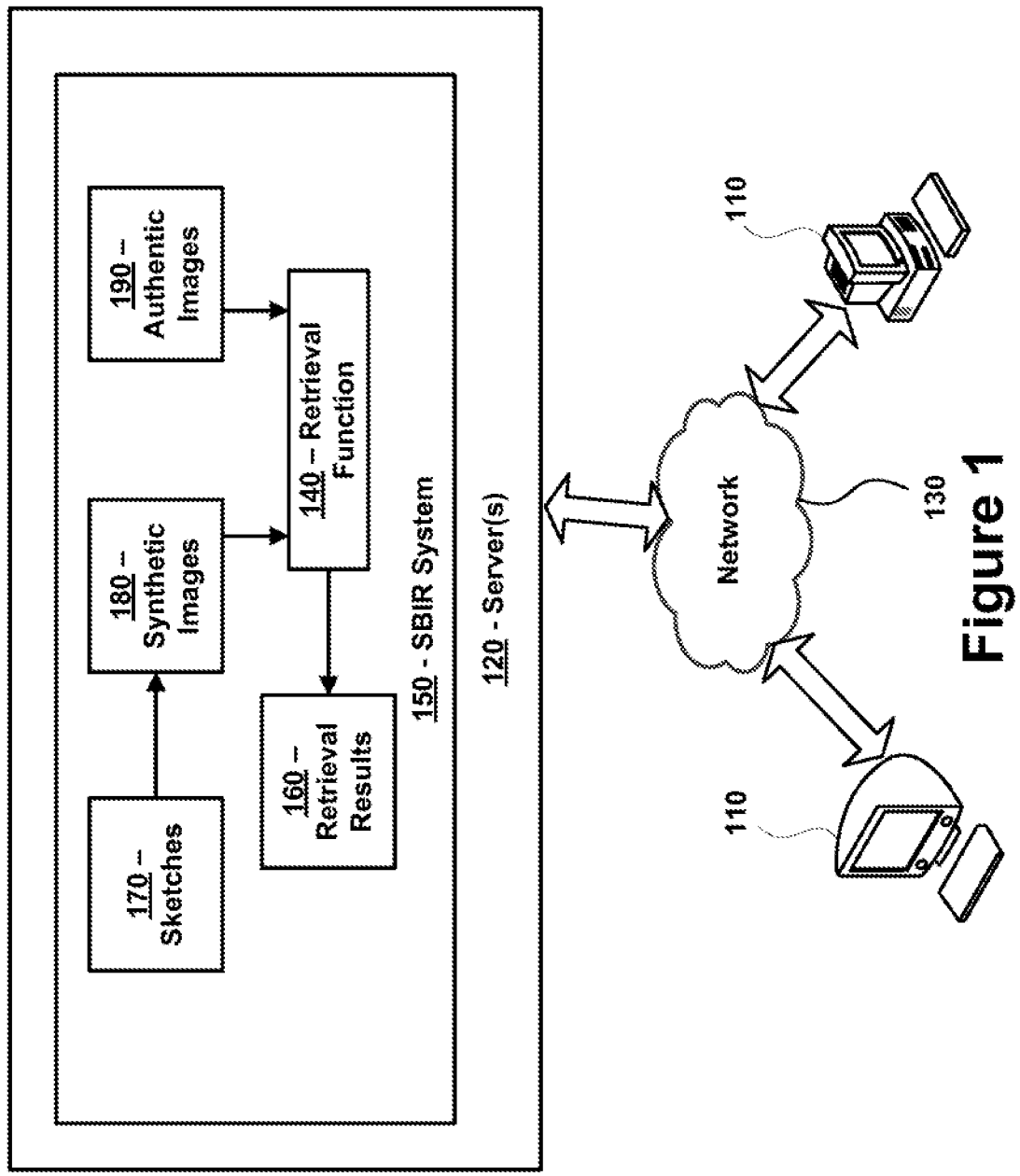
FIG. 1 is a block diagram of a system in accordance with certain embodiments of the present invention.

The present disclosure relates to systems, methods, apparatuses, and computer program products that are configured to implement improved sketch-based image retrieval (SBIR) techniques. In certain embodiments, the SBIR techniques utilize a neural network architecture that is capable of migrating sketches into an image domain in order to identify and retrieve corresponding images. Performing SBIR using these migrated sketches (also referred to herein as "synthetic images") improves the generalization capability of the system, thus providing for better performance and accuracy with respect to identifying and retrieving images. Hash codes can be generated from the synthetic images to be used as a basis for querying an image database. This domain-migration hashing approach to SBIR described herein improves the memory costs, query/retrieval times, and accuracy of the SBIR results in comparison to traditional approaches.

The neural network architecture includes a generative adversarial network (GAN) that is trained to learn both a domain-migration function that can be utilized to transform sketches into corresponding synthetic images (e.g., variations of the sketches that have been migrated into the image domain) that are indistinguishable from authentic real-world images, and a hashing function that generates hash codes from the synthetic images and the authentic images in a consistent and uniform manner. The domain-migration function and hashing function are trained in a manner that preserves semantic consistency across the sketch and image domains. This permits hash codes generated from the synthetic images to be used for accurately identifying and retrieving corresponding authentic images, or vice versa.

In certain embodiments, the GAN includes a pair of generative and discriminative networks that work in cooperation to train the domain-migration function and the hashing function. More specifically, a first generative image network is configured to generate samples of synthetic images from sketches, and a first discriminative image network is configured to evaluate whether or not the synthetic images are indistinguishable from authentic images. In other words, this first pair of networks compete against one another such that the generative image network attempts to produce synthetic images of sufficient quality that can pass as authentic images, and the discriminative image network tries to determine whether or not received image samples are authentic images or synthetic images.

The second pair of generative and discriminative networks performs a similar, but inverse, function associated with translating the synthetic images back into sketches (which are also referred to herein as "synthetic sketches"). That is, a second generative sketch network is configured to generate samples of synthetic sketches from synthetic images and a second discriminative sketch network is configured to evaluate whether or not received samples represent true sketches or synthetic sketches. Using these two pairs of generative and discriminative networks, the GAN applies an adversarial loss function that learns a mapping such that the distributions of migrated sketches (or synthetic images) are indistinguishable from the distribution of authentic images, and simultaneously enhances this indistinguishability by applying a cycle consistency loss function that enables learning of an inverse mapping associated with translating the synthetic images back into the sketch domain.

The SBIR techniques described herein are capable of improving retrieval results not only in the context of category-level SBIR, but also in the context of fine-grained SBIR. For the sake of clarity, this disclosure uses the phrase "category-level" SBIR to generally refer to SBIR techniques that aim to identify authentic images that share the same category as a sketch query, while the phrase "fine-grained" SBIR is used generally to refer to techniques that identify authentic images that share the same intra-category or sub-category as a sketch query. As discussed in further detail below, the GAN that is utilized to map the sketches to synthetic images and to generate hash codes from both synthetic and authentic images is trained utilizing a triplet ranking loss function that preserves the similarity of paired cross-domain instances within an object category to facilitate accurate fine-grained SBIR.

Although the disclosure herein may primarily discuss techniques for identifying authentic images based on received sketch queries, it should be understood that these techniques can additionally, or alternatively, be used for identifying sketches based on received image queries. For example, the domain-migration and hashing functions can be applied to transform sketches and generate hash codes from sketches. The hash codes and sketch information can be stored in a database of the SBIR system. In response to receiving an image query, the hashing function can generate a hash code corresponding to the image and use the hash code to identify one or more corresponding sketches.

The technologies discussed herein can be used in a variety of different contexts and environments. One useful application is in the context of law enforcement. For example, many law enforcement agencies maintain a database of images (e.g., that includes mugshots corresponding to criminals or other individuals), and integrating the present technologies into such systems can enable images of the individuals to be retrieved based on the sketches. Another useful application of these technologies is in the context of e-commerce systems (e.g., that can enable customers to query a product database using sketches of the products to identify corresponding products). A further useful application of these technologies is in the context of surveillance systems (e.g., to permit identification of individuals captured by surveillance videos and/or images to be identified based on sketches). The technologies discussed herein can be applied to other types of systems as well.

The embodiments described herein provide a variety of advantages over conventional SBIR techniques. One significant advantage is the ability to identify and retrieve images based on sketch queries with lower computational and memory costs, faster query/retrieval times, and greater accuracy of the SBIR results. This improved accuracy of the SBIR results can be attributed, at least in part, to the techniques described herein associated with using neural networks to migrate sketches into the image domain prior to generating hash codes from the migrated sketches. Migrating the sketches into the image domain improves the generalization capability of the system which, in turn, allows for better performance and accuracy with respect to identifying and retrieving images. The low computational and memory costs can be attributed, at least in part, to the specialized hashing functions that can quickly and efficiently encode, identify and retrieve the migrated sketches and authentic images. Moreover, when applied in the context of networked-based systems that may include multiple users submitting queries, the low computational and memory costs associated with executing the queries allow for increased network bandwidth and reduced resource consumption across the network.

As evidenced by the disclosure herein, the SBIR techniques set forth in the disclosure are rooted in computer technologies that overcome existing problems in known cross-modal retrieval systems, and particularly problems dealing with improving the accuracy of both category-level and fine-grained SBIR. These techniques describe a technical solution (e.g., one that utilizes various AI-based neural networking and machine learning techniques) for overcoming such limitations. For example, the SBIR system described herein takes advantage of novel AI and machine learning techniques to train a generative adversarial network to learn functions for mapping sketches to synthetic images and to learn an improved hashing function that is capable of generating uniform hash codes for both synthetic images and authentic images in a consistent manner. This technology-based solution marks an improvement over existing computing capabilities and functionalities related to SBIR and other cross-modal retrieval systems by allowing retrieval of images in a manner that improves the accuracy and speed of the retrieval mechanism, even at intra-class or fine-grained levels.

In accordance with certain embodiments, a system is provided for performing sketch-based image retrieval comprising one or more computing devices comprising one or more processors and one or more non-transitory storage devices for storing instructions, wherein execution of the instructions by the one or more processors causes the one or more computing devices to: receive a query comprising a sketch; execute a domain migration function configured to generate a synthetic image corresponding to the sketch; execute a hashing function to generate a hash code corresponding to the synthetic image; and utilize the hash code to identify retrieval results comprising one or more authentic images corresponding to the sketch.

In accordance with certain embodiments, a method is provided for performing sketch-based image retrieval comprising: receiving a query comprising a sketch; executing, with one or more processors, a domain migration function configured to generate a synthetic image corresponding to the sketch; executing, with the one or more processors, a hashing function configured to generate a hash code corresponding to the synthetic image; and utilizing the hash code to identify retrieval results comprising one or more authentic images corresponding to the sketch.

In accordance with certain embodiments, a computer program product is provided for performing sketch-based image retrieval, the computer program product comprising a computer-readable medium including codes for causing a computer to: receive a query comprising a sketch; utilize a domain migration function configured to generate a synthetic image corresponding to the sketch; execute a hashing function configured to generate a hash code corresponding to the synthetic image; and utilize the hash code to identify retrieval results comprising one or more authentic images corresponding to the sketch.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or a solid state memory, a magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

FIG. 1 is an exemplary system 100 for executing the SBIR techniques described herein. In this exemplary system 100, an SBIR system 150 is stored on one or more servers 120. The SBIR system 150 may be utilized in a variety of different contexts. For example, the SBIR system 150 may be integrated into a law enforcement image retrieval system (e.g., that enables retrieval of authentic images 190, such as mugshots, based on sketches 170 of suspects or other individuals), an e-commerce system (e.g., to enable identification and retrieval of authentic images 190 corresponding to products based on sketches 170), a surveillance system (e.g., to search surveillance videos or authentic images 190 based on sketches 170 of individuals), and/or other systems that may benefit from SBIR.

The SBIR system 150 can be configured to perform any and all functions described herein with respect to analyzing, encoding, matching, and/or retrieving sketches 170 and authentic images 190. Generally speaking, the SBIR system 150 can be configured to receive queries in the form of sketches 170 and to retrieve authentic images 190 corresponding to the sketches 170. For example, in response to receiving a sketch 170 of a table, the SBIR system 150 may identify and retrieve one or more authentic images 190 that correspond to a table. As another example, in response to receiving a sketch 170 of an individual, the SBIR system 150 may identify and retrieve one or more authentic images 190 of the specific individual identified in the sketch 170. As a further example, in response to receiving a sketch 170 of a vehicle, the SBIR system 150 may identify and retrieve one or more authentic images 190 of vehicles. In certain embodiments, the SBIR system 150 can additionally, or alternatively, be configured to receive queries in the form of authentic images 190 and to retrieve sketches 170 corresponding to the authentic images 190. For example, in response to receiving an authentic image 190 of a computer, the SBIR system 150 may identify and retrieve one or more sketches 170 that correspond to a computer.

The authentic images 190 stored and/or retrieved by the SBIR system 150 may represent digital representations of photographs, pictures, or the like. The authentic images 190 may initially be captured by recording light or other electromagnetic radiation electronically (e.g., using one or more image sensors) or chemically (e.g., using light-sensitive materials or films). Any authentic images 190 that are not originally created in a digital format can be converted to a digital format using appropriate conversion devices (e.g., image scanners and optical scanners).

The sketches 170 may represent drawings, paintings, graphical depictions, or the like. The sketches 170 may include free-hand and/or hand-drawn content that is created manually by an individual (e.g., using a pencil or pen) and/or digitally created using a computer (e.g., using software that enables the manual creation of sketches and/or automated creation of sketches). In certain embodiments, the sketches 170 received by the SBIR system 150 are provided in a digital format. Once again, sketches 170 that are not originally created in a digital format (e.g., created on paper) can be converted to a digital format using appropriate conversion devices (e.g., image scanners and optical scanners).

The synthetic images 180 may represent "fake," "fabricated," or "synthesized" images that are generated based on the sketches 170. That is, the SBIR system 150 is configured to transform or translate the sketches 170 into the synthetic images 180. Generally speaking, the aim of this transformation or translation is to migrate the sketches 170 into the image domain and to create an indistinguishable image counterpart for each of the sketches 170. In certain embodiments, the function utilized by the SBIR system 150 to perform this conversion applies an upsampling process to the sketches 170, while preserving domain-invariant information associated with the sketches 170 in generating the synthetic images 180. As discussed throughout this disclosure, sketch queries received by the SBIR system 150 may initially be converted to synthetic images 180 prior to searching for authentic images 190 corresponding to the sketches 170 that are subject of the queries. This domain-migration function enables the SBIR system 150 to generate more effective mappings between the sketch and image domains, thus allowing for more accurate identification of the retrieval results 160.

The retrieval function 140 is configured to identify one or more authentic images 190 and/or one or more sketches 170 in response to receiving queries. For example, in response to receiving a sketch query, the retrieval function 140 identifies and retrieves one or more of the authentic images 190 that correspond to a category and/or sub-category associated with the sketch query. As explained further below, hash codes generated from the sketches 170 may be utilized by the retrieval function 140 to identify and retrieve one or more corresponding authentic images 190. In certain embodiments, the retrieval function 140 may additionally, or alternatively, identify and retrieve one or more corresponding sketches 170 in response to receiving image queries (e.g., which may include an authentic image 190 as a query to identify one or more sketches 170 that correspond to a category and/or sub-category associated with the authentic image 190). Again, hash codes generated based on the authentic images 190 may be utilized by the retrieval function 140 to identify and retrieve one or more corresponding sketches 170.

The retrieval results 160 can include any data associated with the results of the search that was performed by the SBIR system 150. For example, in response to receiving a query comprising a sketch 170, the retrieval results 160 can include one or more corresponding authentic images 190. Similarly, in response to receiving a query comprising an authentic image 190, the retrieval results 160 can include one or more corresponding sketches 170. In certain embodiments, the retrieval results 160 can include one or more corresponding authentic images 190 or one or more corresponding sketches 170 that fall with the same category (category-level results) and/or sub-category (fine-grained results) as the query. The retrieval results 160 can be ordered based on their similarity to the query (e.g., such that closely related matches are presented before other matches that are less closely related).

As mentioned above, the SBIR system 150 is configured to perform image recognition and retrieval based on received sketches 170. Generally speaking, the SBIR system 150 can perform the functions related to matching the sketches 170 to authentic images 190, at least in part, by utilizing a specialized GAN that has been trained using AI and/or machine learning algorithms to translate the sketches 170 into synthetic images 180 before querying a database that stores the authentic images 190. The specialized GAN is also trained to learn a hashing function that generates hash codes corresponding to the authentic images 190 and synthetic images 180 in a uniform manner, and that preserves the semantic consistency across the sketch and image domains. As explained in further detail below, two pairs of generative and discriminative networks are utilized to train the GAN to learn the domain-migration and hashing functions.

The queries and/or requests received and fulfilled by the SBIR system 150 can be submitted directly to the SBIR system 150 (e.g., using one or more input devices attached to the one or more servers 120 hosting the SBIR system 150). The requests can additionally, or alternatively, be submitted by one or more computing devices 110. For example, as shown in FIG. 1, a plurality of computing devices 110 may be connected to the SBIR system 150 to enable remote users to access the SBIR system 150 over a network 130. The servers 120 and computing devices 110 may present information and interfaces that enable individuals to submit the requests and to view the retrieval results 160 generated by the SBIR system 150 (e.g., to view images 190 that match the sketches 170 submitted as queries and other information related to the searches conducted by the SBIR system 150). The interfaces can be generated by the SBIR system 150. The interfaces provided to the servers 120 and computing devices 110 may also enable individuals to perform functions related to controlling and managing the searches performed by the SBIR system 150 (e.g., by applying filters to the searches and/or controlling the display of the search results).

In certain embodiments, the computing devices 110 may represent desktop computers, laptop computers, mobile devices (e.g., smart phones, personal digital assistants, tablet devices, vehicular computing devices or any other devices that are mobile in nature), or other types of computing devices. In certain embodiments, the SBIR system 150 is stored on one or more servers 120. The one or more servers 120 may generally represent any type of computing device, including any of the computing devices 110 mentioned above. In certain embodiments, the one or more servers 120 comprise one or more mainframe computing devices that execute web servers capable of communicating with the computing devices 110 and/or other devices over the network 130. The network 130 may represent any type of communication network, e.g., such as one that comprises a local area network (e.g., a Wi-Fi network), a personal area network (e.g., a Bluetooth network), a wide area network, an intranet, the Internet, a cellular network, and/or other types of networks.

All the components illustrated in FIG. 1, including the computing devices 110 and servers 120, can be configured to communicate directly with each other and/or over the network 130 via wired or wireless communication links, or a combination of the two. The computing devices 110 and servers 120 can also be equipped with one or more transceiver devices, one or more computer storage devices (e.g., RAM, ROM, PROM, SRAM, etc.) and one or more processing devices (e.g., a central processing unit) that are capable of executing computer program instructions. The computer storage devices are preferably physical, non-transitory mediums.

Figure 2:
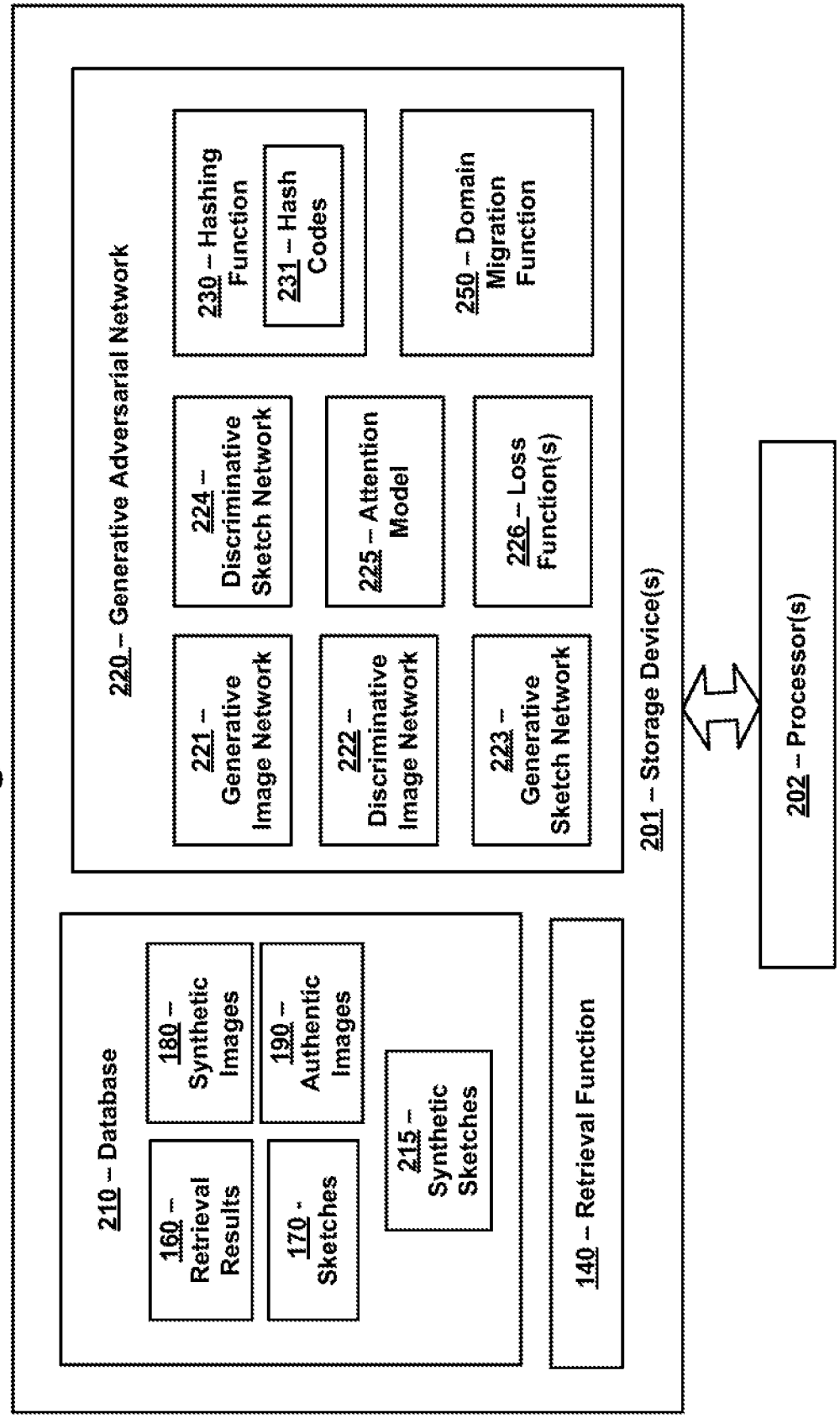
FIG. 2 is a block diagram of an SBIR system in accordance with certain embodiments of the present invention.

FIG. 2 is a block diagram of an exemplary SBIR system 150 in accordance with certain embodiments of the present invention. The SBIR system 150 includes one or more storage devices 201 that are in communication with one or more processors 202. The one or more storage devices 201 can include: i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more central processing units (CPUs), controllers, microprocessors, digital signal processors, and/or computational circuits. The one or more storage devices 201 store data and instructions associated with a database 210, a generative adversarial network 220, a generative image network 221, a discriminative image network 222, a generative sketch network 223, a discriminative sketch network 224, a hashing function 230, a retrieval function 140, a domain-migration function 250, an attention model 225, and one or more loss functions 226. The one or more processors 202 are configured to execute instructions associated with these components which are stored on the one or more storage devices 201. Each of these components is described in further detail below.

The database 210 can store any information associated with conducting searches using the SBIR system 150 and/or presenting information associated with the searches. For example, the database 210 can store sketches 170, synthetic images 180, authentic images 190, and synthetic sketches 215. As mentioned above, the sketches 170 may generally represent free-hand or computed-based drawings or graphical depictions and may be received by the SBIR system 150 as queries for retrieving images 190. The synthetic images 180 may generally correspond to variations of the sketches that have been migrated to the image domain. The synthetic sketches 215 may generally correspond to variations of the synthetic images 180 that have been migrated back into the sketch domain. The authentic images 190 may generally correspond to data captured by imaging sensors, photographs, pictures or like. In certain embodiments, the authentic images 190 may be stored in databases that are maintained by law enforcement agencies, online retailers, surveillance systems, and/or other entities. The database 210 can also be configured to store retrieval results 160 associated with previous or current queries that are executed by the SBIR system 150.

The GAN 220 can represent a neural network that is configured to learn a domain-migration function 250 that is configured to transform sketches 170 into synthetic images 180, as well as a hashing function 230 that is configured to generate hash codes 231 from synthetic images 180 and authentic images 190 in a consistent manner that preserves semantic consistency across image and sketch domains. In certain embodiments, a training phase is applied to the GAN 220 which enables the GAN 220 to learn the domain-migration function 250 and the hashing function 230. During this training phase, a training set of sketches 170 and authentic images 190 can be processed by the GAN 220 and a plurality of loss functions 226 can be utilized to optimize and enhance the domain-migration function 250 and hashing function 230. As explained in further detail herein, the various loss functions 226 that can be utilized to enhance and optimize these functions can include, inter alia, an adversarial loss function, a cycle consistency loss function, a semantic loss function, a quantization loss function, and a triplet ranking loss function.

The domain-migration function 250 can represent a learned function or algorithm that is able to transform sketches 170 into synthetic images 180. Because authentic images 190 include much more information in comparison to sketches 170, the function performed by the domain-migration function 250 for migrating sketches 170 to the image domain can include an upsampling function (e.g., which supplements the sketches 170 with data such that data distributions generated from the sketches 170 are similar or indistinguishable from those of corresponding authenticate images 190).

The hashing function 230 can represent a learned function or algorithm that is configured to generate hash codes 231 from synthetic images 180 and authentic images 190. In certain embodiments, the hashing function 230 can include or utilize a deep residual network (e.g., ResNet) that generates the hash codes 231 from the synthetic images 180 and authenticate images 190 in a consistent manner that preserves semantic consistency across image and sketch domains. In certain embodiments, the hash codes 231 represent binary vectors, binary values or binary codes that correspond to associated authentic images 190 or sketches 170, and the hash codes 231 can be used by the retrieval function 140 to identify sketches 170 and authenticate images 190 that are in the same category or sub-category as a sketch query or image query received by the SBIR system 150.

The adversarial loss function and the cycle consistency loss function can be used to guide the learning of the domain-migration function 250 using a generative and discriminative network structure. More specifically, the GAN 220 includes a generative image network 221 and a discriminative image network 222 that work in cooperation such that generative image network 221 is configured to generate samples of synthetic images 180 from sketches 170, and the discriminative image network 222 is configured to evaluate whether or not the synthetic images 180 are indistinguishable from authentic images. In certain embodiments, the generative image network 221 can generate the samples utilizing a convolutional neural network (CNN) structure as described below. These networks 221 and 222 compete in a minimax game against one another such that the generative image network 221 attempts to produce synthetic images 180 of sufficient quality that can pass as authentic images 190, and the discriminative image network 222 tries to determine whether or not received image samples are authentic images 190 or synthetic images 180. The adversarial loss function is used to train the generative image network 221 to generate synthetic images 180 from the sketches 170 such that the data distributions of the sketches 170 are indistinguishable from authentic images 190.

The consistency loss function is used to further enhance the indistinguishability of the data distributions for the sketches 170 and authentic images 190 using a separate generative and discriminative network structure. More specifically, a generative sketch network 223 and a discriminative sketch network 224 cooperate to perform an inverse function associated with translating the synthetic images 180 back into sketches (which can be referred to herein as "synthetic" or "fake" sketches 215). That is, the generative sketch network 223 is configured to generate samples of synthetic sketches 215 by converting synthetic images 180 (e.g., which were generated by the generative and discriminative image networks 221 and 222) back into the sketch domain, and a discriminative sketch network 224 is configured to evaluate whether or not received samples correspond to real sketches 170 or synthetic sketches 215. Like the generative image network 221, the generative sketch network 223 can be implemented using a CNN. Once again, the adversarial loss function is used to train the generative image network 223 to transform the synthetic images 180 such that the data distributions of the synthetic sketches 215 are indistinguishable from the data distributions of the original sketches 170. The consistency loss function further enhances the learning process of the GAN 220 by preventing the mappings generated by the generative image network 221 from conflicting with the mappings generated by the generative sketch network 223. In this manner, the loss functions 226 (e.g., the adversarial and cycle consistency loss functions) utilized by the GAN 220 can significantly improve the accuracy of the cross-domain mappings that are generated by the domain-migration function 250.

The attention model 225 guides the learning process of the GAN 220 to focus on the most representative regions of the sketches 170, synthetic images 180, and/or authentic images 190 during the domain migration processes. For example, in certain embodiments, the attention model 225 can be integrated into the generative image network 221 and/or generative sketch network 223 to suppress background information in the authenticate images 190 and synthesized images 180 that are processed during the learning process, while simultaneously identifying core regions of the authenticate images 190 and synthesized images 180 that are representative of the categories and/or sub-categories associated with such. Likewise, the attention model 225 can also be configured to identify the core regions of the sketches 170 and synthetic sketches 215 during the learning process. In certain embodiments, the attention model 225 can include a convolutional layer (e.g., with a 1×1 kernel size) and a softmax function with a threshold can be applied to the output for obtaining a binary attention mask.

In addition to the adversarial and cycle consistency loss functions that are utilized to optimize the domain migration function 250, the SBIR system 150 can also utilize loss functions 226 to train and optimize the hashing function 230. More specifically, a semantic loss function can be applied to minimize the distance (e.g., a Hamming distance) between the binary codes of the same category, and to maximize the distance between the binary codes of different categories. In addition, a triplet ranking loss function can utilized to enhance fine-grained learning based on visual similarities of intra-class instances, while a quantization loss function is utilized to preserve the intrinsic structure of the data and to preserve the feature space similarity of pair instances. Each of these loss functions 226 is discussed in further detail below.

Exemplary embodiments of the SBIR system 150 and the aforementioned sub-components (e.g., the database 210, GAN 220, generative image network 221, discriminative image network 222, generative sketch network 223, discriminative sketch network 224, attention model 225, loss functions 226, hashing function 230, retrieval function 140, and domain migration function 250) are described in further detail below. While the sub-components of the SBIR system 150 may be depicted in FIG. 2 as being distinct or separate from one another, it should be recognized that this distinction may be a logical distinction rather than a physical or actual distinction. Any or all of the sub-components can be combined with one another to perform the functions described herein, and any aspect or feature that is described as being performed by one sub-component can be performed by any or all of the other sub-components. Also, while the sub-components of the SBIR system 150 may be illustrated as being implemented in software in certain portions of this disclosure, it should be recognized that the sub-components described herein may be implemented in hardware and/or software.

Figure 3:
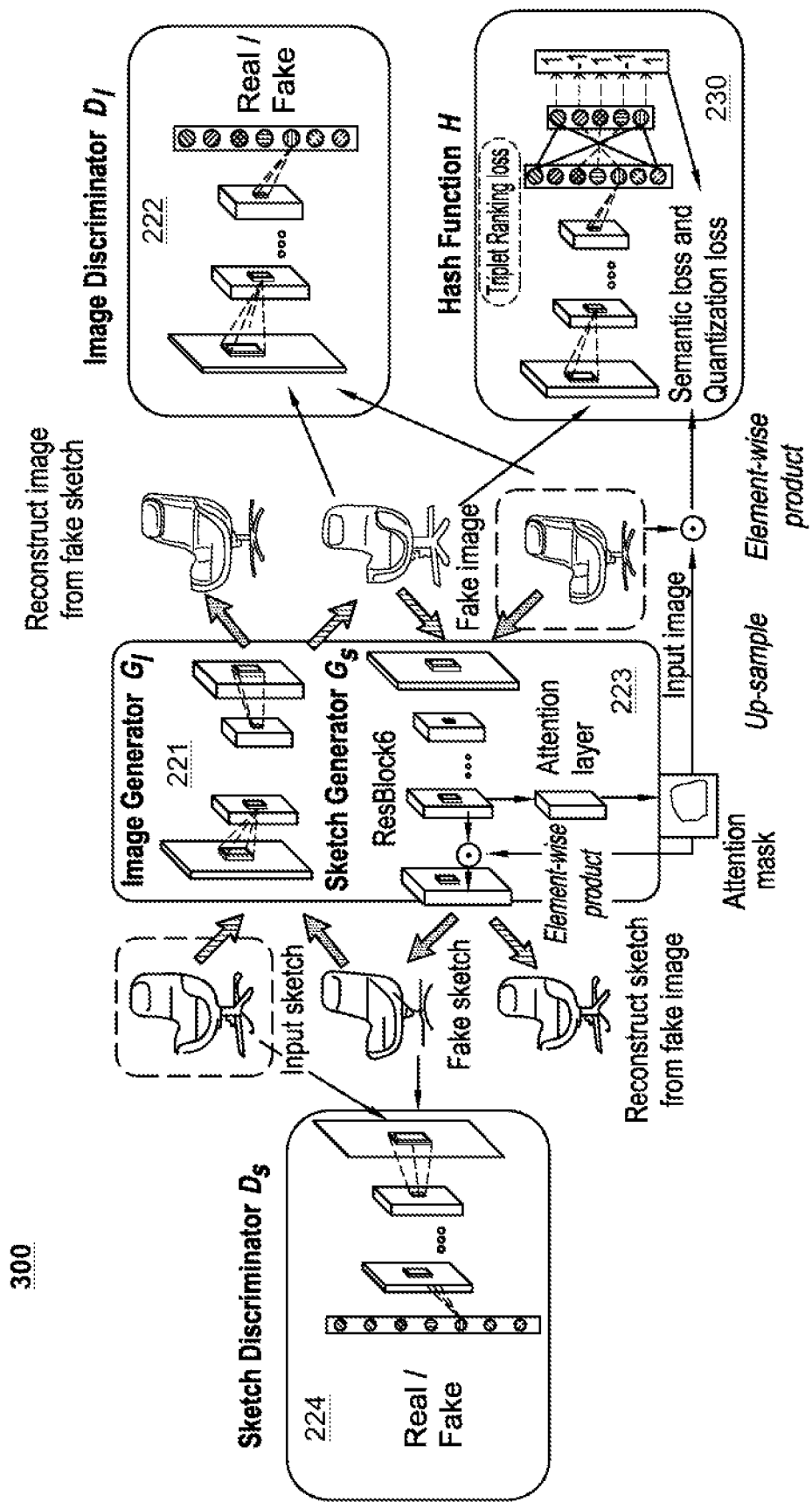
FIG. 3 is a flow diagram illustrating an exemplary architecture for an SBIR system in accordance with certain embodiments.

FIG. 3 is a flow diagram illustrating an exemplary architecture 300 for a SBIR system 150 in accordance with certain embodiments. The exemplary architecture 300 illustrates an underlying design for GAN 220, including the underlying designs of the generative image network 221 (labeled "Image Generator $G_I$"), the discriminative image network 222 (labeled "Image Discriminator $D_I$"), the generative sketch network 223 (labeled "Sketch Generator $G_S$"), and the discriminative sketch network 224 (labeled "Image Discriminator $Ds_i$"). The exemplary architecture 300 further illustrates an underlying design for the hashing function 230 (labeled "Hash Function H").

The architecture illustrates the cycle of how a sketch 170 can be processed by the GAN 220. The arrows that are identified using cross-hashing show the cycle of converting a sketch 170 to a synthetic image 180, while the arrows identified using dots show the cycle of converting a synthetic image 180 to a synthetic sketch 215. As shown, an input sketch query is received by the SBIR system 150 and is processed by the generative image network 221 to generate a synthetic image 180. The discriminative image network 222 evaluates the synthetic image 180 and tries to determine whether or not the synthetic image 180 is an authentic image 190. The synthetic image 180 is then processed by the generative sketch network 223 to generate a synthetic sketch 215. The discriminative sketch network 224 evaluates the synthetic sketch 215 to determine whether or not the synthetic sketch 215 is a true or real sketch. The networks may be enhanced to produce optimal synthetic images 180 using an adversarial loss function and/or cycle consistency loss function.

The synthetic images 180 generated from sketches 170 are provided to a hashing function 230 which can be optimized using a semantic loss function, a quantization loss function, and/or a triplet ranking loss function. An attention mask (e.g., which may be supplied by the attention model 225) is applied to authentic images 190 that are received by the SBIR system 150 before being processed by the hashing function 230. The attention mask can serve to suppress unimportant background information in the authentic images 190 and to focus on representative portions of the authentic images 190. Hash codes 231 generated from the synthetic images 180 and authentic images 190 allows for cross-domain searching and retrieval of corresponding authentic images 190 and/or sketches 170.

Before getting into the specifics of each of the components illustrated in FIG. 3, a formulation of a problem that the SBIR system 150 may be configured to solve is provided. Given $n_1$ training images $I=\{I_i\}_{i=1}^{n_1}$ and $n_2$ training sketches $S=\{S_i\}_{i=1}^{n_2}$ the label vectors (row vectors) for all the training instances are $Y^I=\{y_i^I\}_{i=1}^{n_1} \in \{0,1\}^{n_1 \times c}$ and $Y^S=\{y_i^S\}_{i=1}^{n_2} \in \{0,1\}^{n_2 \times c}$, respectively, where $y_i^I$ and $y_i^S$ are one-hot vectors and c is the number of classes. The SBIR system 150 aims to learn the domain-migration function 250 for migrating sketches to the natural image domain, and simultaneously to learn the hashing function 230 H:{I, $I_{fake}$}→{-1,+1}$^K$, such that the semantic consistency can be preserved between the extracted hashing codes of both authentic images 190 and synthetic images 180. To accomplish the aforementioned goals, the SBIR system 150 optimizes a pair of generative and discriminative networks (e.g., networks 221, 222, 223, and 224) and the hashing network 230.

With respect to the generative networks, let $G_I$ and $G_S$ be two parallel generative CNNs for migrating sketches to the real-world or authenticate image domain (e.g., by creating synthetic images 180) and vice versa: $G_I$:S→I and $G_S$:I→S. Because real-world or authenticate images 190 contain much more information than their sketch counterparts, migrating sketches to the natural image domain is essentially an upsampling process and can potentially include more parameters. Tables 1 and 2 below illustrate exemplary details for implementing the CNNs for $G_I$ and $G_S$.

TABLE 1

| Net | Layer | Kernel Size | Stride | Pad | Output |
|---|---|---|---|---|---|
| $G_S$-Net | Input | — | — | — | 3 × 256 × 256 |
| | conv1 BN | 3 × 3 | 1 | 1 | 32 × 256 × 256 |
| | conv2 BN | 3 × 3 | 1 | 1 | 32 × 256 × 256 |
| | conv3 BN | 4 × 4 | 2 | 1 | 64 × 128 × 128 |
| | conv4 BN | 4 × 4 | 2 | 1 | 128 × 64 × 64 |
| | *ResBlock × 6 | 3 × 3 | 1 | 1 | 128 × 64 × 64 |
| | Attention | 1 × 1 | 1 | 0 | 1 × 64 × 64 |
| | Deconv4 BN | 4 × 4 | 2 | 1 | 64 × 128 × 128 |
| | Deconv5 BN | 4 × 4 | 2 | 1 | 32 × 256 × 256 |
| | Deconv6 BN | 3 × 3 | 1 | 1 | 3 × 256 × 256 |
| $D_S$-Net | input | — | — | — | 3 × 256 × 256 |
| | conv1 BN | 4 × 4 | 2 | 1 | 64 × 128 × 128 |
| | conv2 BN | 4 × 4 | 2 | 1 | 128 × 64 × 64 |
| | conv3 BN | 4 × 4 | 2 | 1 | 256 × 32 × 32 |
| | conv4 BN | 3 × 3 | 1 | 1 | 512 × 32 × 32 |
| | conv5 BN | 3 × 3 | 1 | 1 | 128 × 32 × 32 |

TABLE 2

| Net | Layer | Kernel Size | Stride | Pad | Output |
|---|---|---|---|---|---|
| $G_I$-Net | Input | — | — | — | 3 × 256 × 256 |
| | conv1 BN | 3 × 3 | 1 | 1 | 32 × 256 × 256 |
| | conv2 BN | 3 × 3 | 1 | 1 | 32 × 256 × 256 |
| | conv3 BN | 4 × 4 | 2 | 1 | 64 × 128 × 128 |
| | conv4 BN | 4 × 4 | 2 | 1 | 128 × 64 × 64 |
| | *ResBlock × 9 | 3 × 3 | 1 | 1 | 128 × 64 × 64 |
| | Deconv4 BN | 4 × 4 | 2 | 1 | 64 × 128 × 128 |
| | Deconv5 BN | 4 × 4 | 1 | 1 | 32 × 253 × 253 |
| | Deconv6 BN | 3 × 3 | 1 | 1 | 3 × 256 × 256 |
| $D_I$-Net | input | — | — | — | 3 × 256 × 256 |
| | conv1 BN | 4 × 4 | 2 | 1 | 64 × 128 × 128 |
| | conv2 BN | 4 × 4 | 2 | 1 | 128 × 64 × 64 |
| | conv3 BN | 4 × 4 | 2 | 1 | 256 × 32 × 32 |
| | conv4 BN | 3 × 3 | 1 | 1 | 512 × 32 × 32 |
| | conv5 BN | 3 × 3 | 1 | 1 | 128 × 32 × 32 |

The ResBlock in Tables 1 and 2 can be constructed out of two conv layers with BN and a pass-through so the information from previous layers is unchanged. The hyper-parameters of the conv layer can be as configured as follows: Kernel Size 3×3, Stride 1, Padding 1, and Channels 128.

The parameters of the shared-weight hashing network can be denoted as $\theta_H$. For authentic images 190 and sketches 170, the deep hash function 230 can be formulated as $B^I = \text{sgn}(H(I \odot \text{mask}; \theta_H)) \in \{0, 1\}^{n_1 \times K}$ and $B^S = \text{sgn}(H(G_I(S); \theta_H)) \in \{0, 1\}^{n_2 \times K}$, respectively, where $\text{sgn}(\cdot)$ is the sign function. Note that the row vector of the output is used for the convenience of computation. As explained further below, the deep generative hashing objective of joint learning of binary codes and hash functions is introduced.

In certain embodiments, five losses are introduced into the objective function for achieving the aforementioned goals. An adversarial loss and a cycle consistency loss can be applied to guide the learning of the domain-migration function 250. A semantic loss and triplet ranking loss can be applied to preserve the semantic consistency and visual similarity of intra-class instances across domains. A quantization loss and unification constraint can be applied to preserve the feature space similarity of pair instances. Each of these losses may be integrated into the loss functions 226 mentioned above with respect to FIG. 2. The discussion that follows describes each of these loss functions 226.

Adversarial and Cycle Consistency Loss Functions: The domain-migration networks include four parts: $G_I$, $G_S$, $D_I$ and $D_S$. The parameters of $G_I$, $G_S$, $D_I$ and $D_S$ can be denoted as $\theta_C$. Specifically, $\theta_{C|G_I}$ is the parameter of $G_I$ and so forth. The inputs of domain-migration networks can be image-sketch pairs, and the inputs can have $n_1 \gg n_2$. Thus, the sketches from same category can be reused to match the images. Sketches from the same category are randomly repeated and S will be expanded to $\hat{S} = \{S_1, \ldots, S_1, S_2, \ldots, S_2, S_{n_2}, \ldots, S_{n_2}\}$ to make sure $|\hat{S}| = |I|$. Suppose the data distributions are $I \sim p_I$ and $\hat{S} \sim p_{\hat{S}}$. For the generator $G_I : \hat{S} \to I$ and its discriminator $D_I$, the adversarial loss can be written as:

$$\min_{\theta_{C|G_I}} \max_{\theta_{C|D_I}} \mathcal{L}_G(G_I, D_I, \hat{S}, I) := E_{I \sim p_I}[\log D_I(I \odot \text{mask}; \theta_{C|D_I})] + \quad (1)$$

$$E_{\hat{S} \sim p_{\hat{S}}}[\log(1 - D_I(G_I(\hat{S}, \theta_{C|G_I}), \theta_{C|D_I}))],$$

where:
$\theta_{C|G_I}$ is the parameters of $G_I$;
$\theta_{C|D_I}$ is the parameters of $D_I$;
I represents the training images;
S represents the training sketches;
$\hat{S}$ is the expanded dataset of S;
$I \sim p_I$ and $\hat{S} \sim p_{\hat{S}}$ denote the data distributions; and
mask is the attention mask.

The generator and the discriminator compete in a two-player minimax game: the generator tries to generate images $G_I(\hat{S})$ that look similar to the images from domain I and its corresponding mask, while the discriminator tries to distinguish between authentic images 190 and synthetic images 180. The adversarial loss of the other mapping function $G_S : I \to \hat{S}$ can be defined in a similar manner. The cycle consistency loss can prevent the learned mapping functions $G_I$ and $G_S$ from conflicting against each other, which can be expressed as:

$$\min_{\theta_{C|G_I}, \theta_{C|G_S}} \mathcal{L}_{cyc}(G_I, G_S) := E_{I \sim p_I} \|G_S(G_I(\hat{S}, \theta_{C|G_I}), \theta_{C|G_S}) - \hat{S}\| + \quad (2)$$

$$E_{\hat{S} \sim p_{\hat{S}}} \|G_I(G_S(I, \theta_{C|G_S}), \theta_{C|G_I}) - I \odot \text{mask}\|.$$

where:
$\|\cdot\|$ is the Frobenius norm;
$\theta_{C|G_I}$ is the parameters of $G_I$;

$\theta_{C|G_S}$ is the parameters of $G_S$;
S represents the training sketches;
I represents the training images;
$\hat{S}$ is the expanded dataset of S;
$I \sim p_I$ and $\hat{S} \sim p_{\hat{S}}$ denote the data distributions; and
mask is the attention mask.

The full optimization problem for domain-migration networks is $$\min_{\substack{\theta_{C|G_I}, \theta_{C|D_I} \\ \theta_{C|G_S}, \theta_{C|D_S}}} \max \mathcal{L}_{gan} := \quad (3)$$

$$\mathcal{L}_G(G_I, D_I, \hat{S}, I) + \mathcal{L}_G(G_S, D_S, I, \hat{S}) + \nu \mathcal{L}_{cyc}(G_I, G_S).$$

where:
$\theta_{C|G_I}$ is the parameters of $G_I$;
$\theta_{C|G_S}$ is the parameters of $G_S$;
$\theta_{C|D_I}$ is the parameters of $D_I$;
$\theta_{C|D_S}$ is the parameters of $D_S$;
S represents the training sketches;
I represents the training images;
$\hat{S}$ is the expanded dataset of S; and
$\nu$ is the balance parameter.

In the experiments referred to below, the balance parameter can be set to 10 ($\nu = 10$).

Semantic Loss Function: The label vectors of images and sketches are $Y^I$ and $Y^S$. Consider the following semantic factorization problem with the projection matrix $D \in \mathbb{R}^{c \times K}$:

$$\min_{B^I, B^S, D} \mathcal{L}_{sem} := \|B^I - Y^I D\|^2 + \|B^S - Y^S D\|^2 + \|D\|^2 \quad (4)$$

$$\text{s.t. } B^I \in \{-1, +1\}^{n_1 \times K}, B^S \in \{-1, +1\}^{n_2 \times K}.$$

where:
$B^I$ is the binary codes of real images;
$B^S$ is the binary codes of sketches;
D is the projection matrix;
$Y^I$ is the label vector of training images;
$Y^S$ is the label vector of training sketches;
$n_1$ is the number of training images;
$n_2$ is the number of training sketches; and
K is the length of binary code.

$\mathcal{L}_{sem}$ aims to minimize the distance between the binary codes of the same category, and maximize the distance between the binary codes of different categories.

Quantization Loss Function: The quantization loss is introduced to preserve the intrinsic structure of the data, and can be formulated as follows:

$$\min_{\theta_H} \mathcal{L}_q := \|H(I, \theta_H) - B^I\|^2 + \|H(G_I, (S, \theta_{C|G_1}); \theta_H) - B^S\|^2 \quad (5)$$

where:
$B^I$ is the binary codes of real images;
$B^S$ is the binary codes of sketches;
$\theta_H$ is the parameter of hashing net;
$\theta_{C|G_I}$ is the parameters of $G_I$;
S represents the training dataset of sketches; and
I represents the training images.

Triplet Ranking Loss: For the fine-grained SBIR retrieval task, a triplet ranking loss can be integrated into the objective function for preserving the similarity of paired cross-domain instances within an object category. For a given triplet $(S_i, I_i^+, I_i^-)$, specifically, each triplet contains a query sketch $S_i$ and a positive image sample $I_i^+$ and a negative image sample $I_i^-$. The triplet ranking loss function can be defined as follows:

$$\min_{\theta_H} \mathcal{L}_{tri} := \Sigma_i \max(0, \Delta + \|H(G_I(S_i, \theta_{C|G_I}); \theta_H) - H(I_i^+; \theta_H)\|^2 - \|H(G_I(S_i, \theta_{C|G_I}); \theta_H) - H(I_i^-; \theta_H)\|^2), \quad (6)$$

where:

$\theta_H$ is the parameter of hashing net;
$\theta_{C|G_I}$ is the parameters of $G_I$;
$S_i$ is a giving query sketch from training sketches;
$I_i^+$ is a positive image sample from training images;
$I_i^-$ is a negative image sample from training images; and
$\Delta$ represents the margin between the similarities of the outputs of the two pairs $(S_i, I_i^+)$ and $(S_i, I_i^-)$.

The parameter $\Delta$ represents the margin between the similarities of the outputs of the two pairs $(S_i, I_i^+)$ and $(S_i, I_i^-)$. In other words, the hashing function 230 ensures that the Hamming distance between the outputs of the negative pair $(S_i, I_i^-)$ is larger than the Hamming distance between the outputs of the positive pair $(S_i, I_i^+)$ by at least a margin of $\Delta$. In certain embodiments, $\Delta$ may be equal to half of the code length (i.e., $\Delta = 0.5K$).

Full Objective Function: The binary codes (e.g., hash codes 231) of an authentic image 190 and a synthetic image 180 are desired to be close to each other. Thus, a unification constraint $L_c = \|H(I; \theta_H) - H(G_I(\hat{S}, \theta_{C|G_I}); \theta_H)\|^2$ is added to the final objective function which is formulated as follows:

$$\min_{B^I, B^S, \theta_C, \theta_H} \mathcal{L}_{total} := \mathcal{L}_{gan} + \mathcal{L}_{sem} + \lambda \mathcal{L}_{tri} + \alpha \mathcal{L}_q + \beta \mathcal{L}_c, s.t. B^I \in \{-1, +1\}^{n_1 \times K}, B^S \in \{-1, +1\}^{n_2 \times K}, \quad (7)$$

where:

$\lambda$ is a control parameter, which equals 1 for fine-grained task and equals 0 for semantic-level SBIR only;
$\alpha$ is a balance parameter of quantization loss; and
$\beta$ is a balance parameter of the unification constraint.

In the above equation, $\lambda$ is a control parameter, which equals 1 for fine-grained task and equals 0 for semantic-level SBIR only. The hyper-parameters $\alpha$ and $\beta$ control the contributions of the two corresponding terms.

Due to the non-convexity of the joint optimization and the NP-hardness to output the discrete binary codes, it may be infeasible to find the global optimal solution. Instead, an optimization algorithm can be applied based on alternating iteration and it can be used to sequentially optimize one variable at a time while the others are fixed. In this way, variables D, $B^I$, $B^S$, parameter $\theta_C$ of the domain-migration networks, and parameter $\theta_H$ of the hash function can be iteratively updated.

Optimizing D: More specifically, with respect to optimizing D, all the variables can be fixed except D, and Equation (7) above can be simplified as a classic quadratic regression problem:

$$\min_D \|B^I - Y^I D\|^2 + \|B^S - Y^S D\|^2 + \|D\|^2 = \min tr_D(D^T(Y^{I^T}Y^I + Y^{S^T}Y^S + I)D) - 2tr(D^T(Y^{I^T}B^I + Y^{S^T}B^S)), \quad (8)$$

where:

$B^I$ is the binary codes of real images;
$B^S$ is the binary codes of sketches;
D is the projection matrix;
$Y^I$ is the label vector of training images;
$Y^S$ is the label vector of training sketches;
$D^T$ is the transposed matrix of D;
$Y^{I^T}$ is the transposed matrix of $Y^I$;
$Y^{S^T}$ is the transposed matrix of $Y^S$; and
I is an identity matrix.

In the above equation, I is an identity matrix. Taking the derivative of the above function with respect to D and setting it to zero, the analytical solution to Equation (8) above is:

$$D = (Y^{I^T}Y^I + Y^{S^T}Y^S + I)^{-1}(Y^{I^T}B^I + Y^{S^T}B^S) \quad (9)$$

where:

$B^I$ is the binary codes of real images;
$B^S$ is the binary codes of sketches;
D is the projection matrix;
$Y^I$ is the label vector of training images;
$Y^S$ is the label vector of training sketches;
$Y^{I^T}$ is the transposed matrix of $Y^I$;
$Y^{S^T}$ is the transposed matrix of $Y^S$; and
I is an identity matrix.

Optimizing $B^I$: When all the variables are fixed except $B^I$, Equation (7) can be rewritten as:

$$\min_{B^I} \|B^I - Y^I D\|^2 + \alpha \|H(I; \theta_H) - B^I\|^2. \quad (10)$$

where:

$B^I$ is the binary codes of real images;
$Y^I$ is the label vector of training images;
D is the projection matrix;
$\alpha$ is a balance parameter of quantization loss;
$\theta_H$ is the parameter of hashing net; and
I represents the training dataset of real images.

Since $tr(B^{I^T}B^I)$ a constant, Equation (10) is equivalent to the following problem:

$$\min_B -tr(B^{I^T}(Y^I D + \alpha H(I; \theta_H))) \quad (11)$$

where:

$B^I$ is the binary codes of real images;
$B^{I^T}$ is the transposed matrix of $B^I$;
$Y^I$ is the label vector of training images;
D is the projection matrix;
$\alpha$ is a balance parameter of quantization loss;
$\theta_H$ is the parameter of hashing net; and
I represents the training images.

For $B^I \in \{-1, +1\}^{n_1 \times K}$, $B^I$ has a closed-form solution as follows:

$$B^I = \text{sgn}(Y^I D + \alpha H(I; \theta_H)) \quad (12)$$

where:

$B^I$ is the binary codes of real images;
$Y^I$ is the label vector of training images;
D is the projection matrix;
$\alpha$ is a balance parameter of quantization loss;
$\theta_H$ is the parameter of hashing net; and
I represents the training images.

Optimizing $B^S$: Considering all the terms related to $B^S$, it can be learned by a similar formulation as Equation (12):

$$B^S = \text{sgn}(Y^S D + \alpha H(G_I(S, \theta_{C|G_I}); \theta_H)) \quad (13)$$

where:

$B^S$ is the binary codes of sketches;
$Y^S$ is the label vector of training sketches;
D is the projection matrix;
$\alpha$ is a balance parameter of quantization loss;
$\theta_H$ is the parameter of hashing net;
S represents the training sketches; and
$\theta_{C|G_I}$ is the parameters of $G_I$.

Optimizing $\theta_C$ and $\theta_H$: After the optimization for D, $B^I$ and $B^S$, the network parameters $\theta_C$ and $\theta_H$ can be updated according to the following loss:

$$\min_{\theta_C,\theta_H} \mathcal{L} := \mathcal{L}_{gan} + \lambda \mathcal{L}_{tri} + \alpha \mathcal{L}_q + \beta \mathcal{L}_c. \quad (14)$$

where:
$\lambda$ is a control parameter, which equals 1 for fine-grained task and equals 0 for semantic-level SBIR only;
$\alpha$ is a balance parameter of quantization loss; and
$\beta$ is a balance parameter of the unification constraint.

The networks can be trained on I and $\hat{S}$, where the sketch-image pairs are randomly selected to compose of a mini-batch, and then backpropagation algorithm with stochastic gradient descent (SGD) is adopted for optimizing two networks. In practice, deep learning frameworks (e.g., Pytorch) can be used to achieve all the steps. $D \rightarrow B^I \rightarrow B^S \rightarrow \{\theta_C, \theta_H\}$ can be iteratively updated in each epoch. As such, the generative domain-migration hashing (GDH) can be finally optimized within L epochs, where $20 \leq L \leq 30$ in our experiment. The algorithm used for GDH can be Algorithm (1) below.

---

Algorithm 1: Generative Domain-Migration Hash

---

Input: Training natural images $I = \{I_i\}_{j=1}^{n_1}$ and the corresponding sketches $S = \{S_i\}_{i=1}^{n_2}$; the label information $Y^I$ and $Y^S$; the code length K; the number of training epochs L; the balance parameters $\alpha$, $\beta$, $\lambda$.
Output: Generative models $G_I$ and $G_S$; deep hash function H.
1: Randomly initialize $B^I \in \{-1, +1\}^{n_1 \times K}$ and $B^S \in \{-1, +1\}^{n_2 \times K}$;
2: For l = 1,2,..., L do
3: Update D according to Equation (9);
4: Update $B^I$ according to Equation (12);
5: Update $B^S$ according to Equation (13);
6: Update the network parameters $\theta_C$ and $\theta_H$ according to Equation (14) by training with the l - th epoch data;
7: End
8: Return the network parameters $\theta_C$ and $\theta_H$.

---

Once the GDH model is learned, for a given query sketch $s_q$, the SBIR system 150 can infer its binary code $b^{s_q} = \text{sgn}(\tilde{H}(G_I(S_q, \theta_{C|G_I}); \theta_H))$ through the $G_I$ network and the hash network H. For the image gallery, the hash codes $b^I = \text{sgn}(H(I \odot \text{mask}; \theta_H))$ of each image can be computed through the hash network (e.g., by using the hashing function 230), where a mask can be easily obtained by $G_S(/; \theta_{C|G_S})$. In should be noted that the synthetic or fake images 180 images generated by $G_I(S_q; \theta_{C|G_I})$ can be non-background images and, therefore, do not need to be multiplied with the mask before being supplied into the hashing network 230.

Extensive experiments and ablation studies were conducted to evaluate an implementation of the SBIR system 150 described herein. The results demonstrate that the SBIR techniques described herein consistently achieve better performance with much faster query time and much lower memory cost compared to other SBIR methods. This is true for both category-level SBIR and fine-grained SBIR. The SBIR techniques outperformed the best-performing hashing-based SBIR method by up to 20.5% on the TU-Berlin Extension dataset, and up to 26.4% on the Sketchy dataset.

Figure 4:
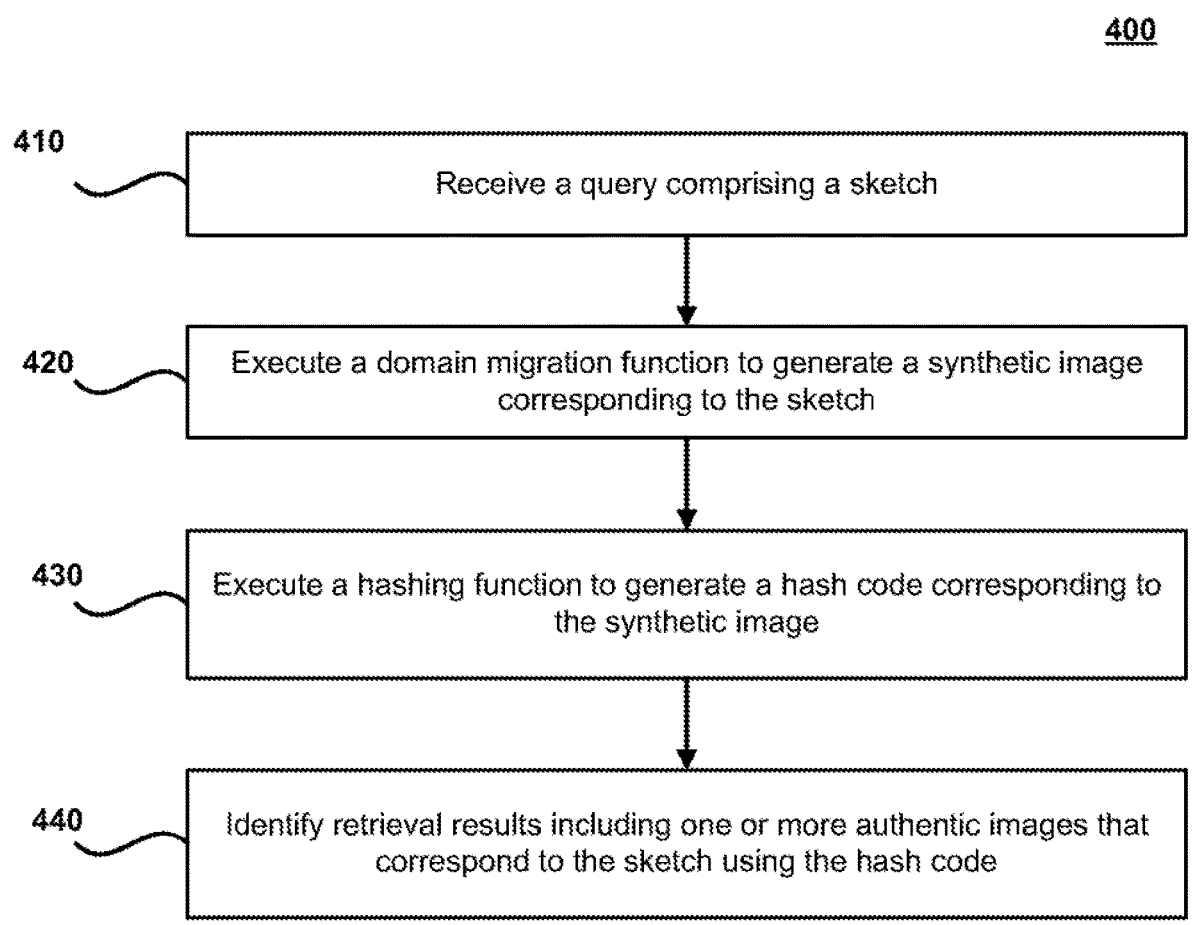
FIG. 4 is a flow chart of a method for implementing an exemplary SBIR technique in accordance with certain embodiments of the present invention.

FIG. 4 is a flow chart of a method 400 for implementing an exemplary SBIR technique in accordance with certain embodiments of the present invention. The exemplary method 400 may be executed in whole or in part by the SBIR system 150. For example, one or more storage devices 201 can store instructions for performing the steps of method 400, and one or more processors 202 can be configured to execute performance of the steps of method 400.

In step 410, a query comprising a sketch 170 is received. The sketches 170 may represent free-hand and/or hand-drawn content (e.g., such as a drawing, painting, or the like) that is created manually by an individual (e.g., using a pencil/pen or computing software). The query may be received at a server 120 or computing device 110 that hosts or stores the SBIR system 150. In certain embodiments, the SBIR system 150 may be implemented, at least in part, using a program or application that is running on a computing device 110, and the sketch 170 can be selected by a user operating the device. In other embodiments, the SBIR system 150 may be hosted on a server 120 and the query may be transmitted over a network 130 to the server 120.

In step 420, a domain migration function 250 is executed to generate a synthetic image 180 corresponding to the sketch 170. In certain embodiments, the GAN 220 may be utilized to train a domain-migration function 250 that is configured to transform the sketch 170 into a synthetic image 180. In certain embodiments, the GAN 220 may include two sets of generative networks and discriminative networks, which use one or more loss functions 226 (e.g., an adversarial loss function and a cycle consistency loss function) to generate and enhance the domain-migration function 227.

In step 430, a hashing function 230 is executed to generate a hash code 231 corresponding to the synthetic image 180. In certain embodiments, the hash code 231 may represent a binary code corresponding to the sketch 170. The hashing function 230 can be configured to generate hash codes 231 for both synthetic images 180 and authentic images 190 in a manner that preserves semantic consistency across image and sketch domains. In certain embodiments, the GAN 220 learns the hashing function 230 using one or more loss functions 226 (e.g., an semantic loss function, a quantization loss function and a triplet ranking loss function) which can be configured to minimize a distance measure (e.g., a Hamming distance) between binary codes of authentic images 190 and synthetic images 180 that fall within the same category, and to maximize the distance measure between binary codes that are not within the same category. The loss functions 226 can also be configured to preserve intra-category characteristics of the sketches 170 and authentic images 190.

In step 440, retrieval results 160 are identified using the hash code 231 which include one or more authentic images 190 that correspond to the sketch 170. The hash code 231 generated for the sketch 170 may be compared with one or more hash codes 231 that have been generated for, and associated with, authentic images 190. The retrieval results 160 may be presented to an individual who submitted the query. For example, the retrieval results 160 may be transmitted over a network 130 and/or output on display device (e.g., presented on a computer monitor) of a computing device 110 that is in communication with, or which stores, the SBIR system 150.

While various novel features of the invention have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system for performing sketch-based image retrieval (SBIR) comprising:
one or more computing devices comprising one or more processors and one or more non-transitory storage devices for storing instructions, wherein execution of the instructions by the one or more processors causes the one or more computing devices to:
receive a query comprising a sketch;
execute a domain migration function configured to generate a synthetic image corresponding to the sketch;
execute a hashing function configured to generate a hash code corresponding to the synthetic image;
utilize the hash code to identify retrieval results comprising one or more authentic images corresponding to the sketch; and
wherein the domain migration function is learned using a neural network that includes a generative adversarial network that is trained to migrate the sketch into an image domain, at least in part, by applying an upsampling process to the sketch.

2. The system of claim 1, wherein the generative adversarial network includes at least one generative network and at least one discriminative network that cooperate to learn the domain migration function that is used to translate the sketch into the synthetic image.

3. The system of claim 2, wherein the at least one generative network and the at least one discriminative network compete in a two-player minimax game such that:
the at least one generative network is configured to generate synthetic images; and
the at least one discriminative network is configured to evaluate whether received inputs correspond to authentic images or synthetic images.

4. The system of claim 1, wherein the generative adversarial network is trained to learn the hashing function that generates the hash code from the synthetic image in a manner that preserves semantic consistency across image and sketch domains.

5. The system of claim 1, wherein:
the hash code generated by the hashing function is a binary code; and
a neural network is trained, at least in part, using a loss function that is configured to minimize a distance between binary codes of authentic images and synthetic images that are within the same category, and to maximize the distance between binary codes that are not within the same category.

6. The system of claim 1, wherein the neural network is trained, at least in part, using a loss function that is configured to preserve visual similarities of intra-class sketches and authentic images.

7. The system of claim 1, wherein execution of the instructions by the one or more processors further causes the one or more computing devices to:
generate hash codes for a plurality of authentic images using the hashing function; and
utilize the hash code generated for the synthetic image and the hash codes generated for the plurality of authentic images to identify the one or more authentic images to be included in the retrieval results.

8. The system of claim 7, wherein generating the hash codes for the plurality of authentic images includes applying an attention model to suppress background information in the plurality of authentic images and to identify features that are representative of categories associated with the plurality of authentic images.

9. The system of claim 1, wherein the system is integrated into one or more of: a law enforcement image retrieval system; an e-commerce system; or a surveillance system.

10. A method for performing sketch-based image retrieval (SBIR) comprising:
receiving a query comprising a sketch;
executing, with one or more processors, a domain migration function configured to generate a synthetic image corresponding to the sketch;
executing, with the one or more processors, a hashing function configured to generate a hash code corresponding to the synthetic image;
utilizing the hash code to identify retrieval results comprising one or more authentic images corresponding to the sketch; and
wherein the domain migration function is learned using a neural network that includes a generative adversarial network that is trained to migrate the sketch into an image domain, at least in part, by applying an upsampling process to the sketch.

11. The method of claim 10, wherein the generative adversarial network includes at least one generative network and at least one discriminative network that cooperate to learn the domain migration function that is used to translate the sketch into the synthetic image.

12. The method of claim 11, wherein the at least one generative network and the at least one discriminative network compete in a two-player minimax game such that:
the at least one generative network is configured to generate synthetic images; and
the at least one discriminative network is configured to evaluate whether received inputs correspond to authentic images or synthetic images.

13. The method of claim 10, wherein the generative adversarial network is utilized to learn the hashing function that generates the hash code from the synthetic image in a manner that preserves semantic consistency across image and sketch domains.

14. The method of claim 10, wherein:
the hash code generated by the hashing function is a binary code; and
the neural network is trained, at least in part, using a loss function that is configured to minimize a distance between binary codes of authentic images and synthetic images that are within the same category, and to maximize the distance between binary codes that are not within the same category.

15. The method of claim 10, wherein the neural network is trained, at least in part, using a loss function that is configured to preserve visual similarities of intra-class sketches and authentic images.

16. The method of claim 10 further comprising:
generating hash codes for a plurality of authentic images using the hashing function; and
utilizing the hash code generated for the synthetic image and the hash codes generated for the plurality of authentic images to identify the one or more authentic images to be included in the retrieval results.

17. The method of claim 16, wherein generating the hash codes for the plurality of authentic images includes applying an attention model to suppress background information in the plurality of authentic images and to identify features that are representative of categories associated with the plurality of authentic images.

18. A computer program product for performing sketch-based image retrieval (SBIR), the computer program product comprising a physical, non-transitory computer-readable medium including codes for causing a computer to:
receive a query comprising a sketch;
utilize a domain migration function configured to generate a synthetic image corresponding to the sketch;
execute a hashing function configured to generate a hash code corresponding to the synthetic image;
utilize the hash code to identify retrieval results comprising one or more authentic images corresponding to the sketch; and
wherein the domain migration function is learned using a neural network that includes a generative adversarial network that is trained to migrate the sketch into an image domain, at least in part, by applying an upsampling process to the sketch.

* * * * *